US006906280B2

(12) United States Patent
Rosocha

(10) Patent No.: US 6,906,280 B2
(45) Date of Patent: Jun. 14, 2005

(54) FAST PULSE NONTHERMAL PLASMA REACTOR

(75) Inventor: Louis A. Rosocha, Los Alamos, NM (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/395,047

(22) Filed: Mar. 21, 2003

(65) Prior Publication Data

US 2004/0182832 A1 Sep. 23, 2004

(51) Int. Cl.[7] ................................................ B23K 10/00

(52) U.S. Cl. .................. 219/121.31; 204/164; 204/177; 219/121.43

(58) Field of Search ........................ 219/121.31, 121.36, 219/121.56, 121.57, 121.43, 121.52; 204/164, 177, 178, 179; 588/247; 422/186.04, 907, 40

(56) References Cited

U.S. PATENT DOCUMENTS

| | | | | | |
|---|---|---|---|---|---|
| 4,317,067 | A | * | 2/1982 | Fitzsimmons et al. | 315/150 |
| 5,458,748 | A | * | 10/1995 | Breault et al. | 204/177 |
| 6,374,595 | B1 | * | 4/2002 | Penetrante et al. | 60/275 |
| 2001/0001435 | A1 | * | 5/2001 | Palekar et al. | 204/164 |
| 2003/0161774 | A1 | * | 8/2003 | Josephson et al. | 423/240 R |

OTHER PUBLICATIONS

Rosocha, L.A. et al.; "Criteria for the Generation of Homogeneous Oxygen Plasma Suitable for Ozone Synthesis," Proceedings of the 5th International Symposium on Plasma Chemistry, International Union of Pure and Applied Chemistry, B. Waldie and G.A. Farnell, eds. pp. 421–426, (1991).

Rosocha, L.A.; "Design and Analysis of Transient High Voltage Electrical Devices: Ozone Production in Fast Pulsed Dielectric Barrier Discharges in Oxygen and Modeling of an Intense Relativistic Electron Beam Source," Thesis Abstract, University of Wisconsin–Madison, (1979).

Rosocha, L.A.; "Ozone Production in Fast Pulsed High Voltage Dielectric Barrier Discharges in O2," Abstracts of the 31st Gaseous Electronics Conference, Oct. 17–20, 1978, Buffalo, New York.

Rosocha, L.A.; "Fast Pulsed Dielectric Barrier Discharges in O2—Kinetic Modelling and O3 Production," Abstracts of the DEAP Meeting of the American Physical Society, Nov. 29–Dec. 1, 1978, Madison, WI.

Rosocha, LA.; "Some Examples of Plasma Chemistry in Fast Pulsed High E/P Electrical Discharges in Gases," Abstracts of the 32nd Gaseous Electronics Conference, Oct. 9–12, 1979, Pittsburgh, PA.

* cited by examiner

*Primary Examiner*—Quang T. Van
(74) *Attorney, Agent, or Firm*—John P. O'Banion

(57) ABSTRACT

A fast pulsed nonthermal plasma reactor includes a discharge cell and a charging assembly electrically connected thereto. The charging assembly provides plural high voltage pulses to the discharge cell. Each pulse has a rise time between one and ten nanoseconds and a duration of three to twenty nanoseconds. The pulses create nonthermal plasma discharge within the discharge cell. Accordingly, the nonthermal plasma discharge can be used to remove pollutants from gases or break the gases into smaller molecules so that they can be more efficiently combusted.

30 Claims, 6 Drawing Sheets

FAST PULSE NONTHERMAL PLASMA REACTOR

STATEMENT REGARDING FEDERALLY SPONSORED RESEARCH OR DEVELOPMENT

This invention was made with Government support under Contract No. W-7405-ENG-36, awarded by the Department of Energy. The Government has certain rights in this invention.

CROSS-REFERENCE TO RELATED APPLICATIONS

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to for processing pollutant containing gases, and more particularly to nonthermal plasma reactors.

2. Description of Related Art

The emission and discharge of volatile organic compounds (VOCs) are strictly regulated by the U.S. Conservation and Recovery Act (RCRA), the National Pollutant Discharge Elimination System (NPDES), and the National Emissions Standards for Hazardous Air Pollution regulations (NESHAPS). Technical and regulatory difficulties associated with current VOC treatment methods such as air-stripping (dilution), activated-carbon absorption, incineration, and thermal-catalytic treatment have prompted the search for alternatives. The drawbacks of present methods result in ineffective treatment, the generation of large secondary waste streams, and increased costs.

The present invention has recognized the prior art drawbacks, and has provided the below-disclosed solutions to one or more of the prior art deficiencies.

BRIEF SUMMARY OF THE INVENTION

The present invention can be used to effectively treat VOCs while meeting regulations in a timely and economical fashion. In addition to VOCs, the present invention can be used to treat other air pollutants and hazardous/toxic chemicals in gases (e.g., acid rain precursors NOx and SOx, odor causing chemicals, chemical/biological warfare agents, and industrial emissions). Furthermore, to operate fossil-fueled motor vehicles and other combustion-related engines or machinery under higher efficiency and reduced pollution output conditions in the future, it is desirable to have clean-burning, energy-efficient, hydrocarbon liquid fuels. Such higher-order hydrocarbons can be synthesized using a nonthermal plasma (NTP) device according to the present invention.

By way of example, and not of limitation, the present invention is a device that employs electrical discharges/nonthermal plasmas in a gaseous medium to destroy air pollutants or undesirable chemicals/chemical or biological agents, to process chemicals, or to synthesize chemical compounds. In nonthermal plasmas, the electrons are "hot", while the ions and neutral species are "cold" which results in little waste enthalpy being deposited in a process gas stream. This is in contrast to thermal plasmas, where the electron, ion, and neutral-species energies are in thermal equilibrium (or "hot") and considerable waste heat is deposited in the process gas.

In the present invention, the NTP reactor is applied to gas streams containing hazardous/toxic, or other undesirable pollutants or contaminants and to gas streams that are to be processed (i.e., changed in chemical form or transformed into other useful products).

In one aspect of the present invention, a nonthermal plasma reactor includes a discharge cell and a charging assembly. The charging assembly provides plural high voltage pulses to the discharge cell. Each high voltage pulse has a rise time between one and ten nanoseconds and a duration between three and twenty nanoseconds.

In another aspect of the present invention, a nonthermal plasma reactor includes a discharge cell and a first charging assembly and a second charging assembly that are electrically connected to the discharge cell. The charging assemblies alternatingly provide opposite polarity high voltage pulses to the reactor.

In yet another aspect of the present invention, a nonthermal plasma reactor includes a first capacitor plate and a second capacitor plate. A dielectric layer is disposed between the first capacitor plate and the second capacitor plate. Further, a spark gap switch is electrically connected to the first capacitor plate and a first electrode is electrically connected to the second capacitor plate. A second electrode is slightly spaced from the first electrode and a dielectric layer is disposed adjacent to the first electrode. Moreover, a gas discharge gap is established between the dielectric layer and the second electrode. In this aspect of the present invention, the first capacitor plate and the second capacitor plate provide plural high voltage pulses to the discharge cell.

In yet still another aspect of the present invention, a nonthermal plasma reactor includes a first capacitor plate, a second capacitor plate, and a first dielectric layer that is disposed therebetween. A first spark gap switch is electrically connected to the first capacitor plate. The reactor further includes a third capacitor plate, a fourth capacitor plate, and a second dielectric layer that is disposed therebetween. Further, a second spark gap switch is electrically connected to the third capacitor plate. In this aspect of the present invention, a first electrode is electrically connected to the second capacitor plate and the fourth capacitor plate and a second electrode is slightly spaced from the first electrode. A dielectric layer is disposed adjacent to the first electrode and a gas discharge gap is established between the dielectric layer and the second electrode. The first capacitor plate, the second capacitor plate, the third capacitor plate, and the fourth capacitor plate alternatingly provide opposite polarity high voltage pulses to the reactor.

In still yet another aspect of the present invention, a nonthermal plasma reactor includes a discharge cell and means for providing plural high voltage pulses to the discharge cell. Each high voltage pulse has a rise time of not more than ten nanoseconds.

In another aspect of the present invention, a method for treating pollutant containing gases includes providing a discharge cell. Plural high voltage pulses are provided to the discharge cell. Each high voltage pulse has a rise time of not more than ten nanoseconds.

In yet another aspect of the present invention, a method for treating pollutant containing gases comprises providing a discharge cell. Plural opposite polarity high voltage pulses are alternatingly provided to the discharge cell. Each opposite polarity high voltage pulse has a rise time of not more than ten nanoseconds.

An object of the invention is to provide a relatively high degree of contaminant removal.

Another object of the invention is to reduce contaminant removal costs.

Another object of the invention is to provide more efficient chemical processing/synthesis.

Another object of the invention is to provide for nonthermal treatment of pollutant containing gases.

Another object of the invention is to provide for simultaneous destruction and removal of multiple pollutants.

Another object of the invention is to eliminate the need for fuels or catalysts.

Another object of the invention is to provide a broad dynamic range for treatment of both rich and lean streams.

Another object of the invention is to provide for higher active species production efficiency with extremely short, high E/N pulses, where E/N is the reduced electric field strength when the process gas experiences electrical breakdown.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 9. It will be appreciated that the apparatus may vary as to configuration and as to details of the parts, and that the method may vary as to the specific steps and sequence, without departing from the basic concepts as disclosed herein.

Figure 1:
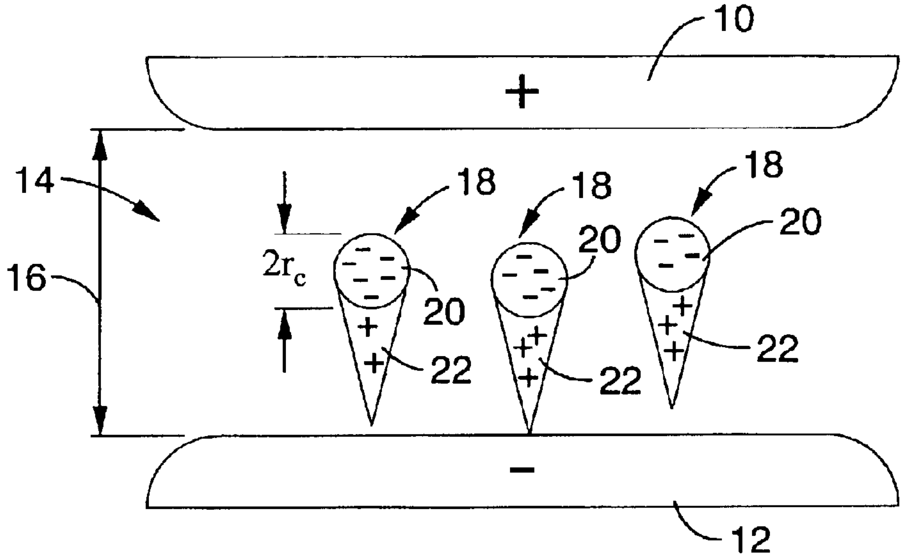
FIG. 1 is a schematic diagram of electrical discharge streamers in a gas discharge gap between two electrodes.

Referring initially to FIG. 1, a positive electrode and a negative electrode are shown and designated 10 and 12, respectively. A gas discharge gap 14 is established between the electrodes 10, 12. As shown, the gas discharge gap 14 has a width 16. Moreover, three non-limiting, exemplary discharge streamers 18 are shown between the electrodes 10, 12 within the gas discharge gap 14. Each discharge streamer 18 shown has a head 20 and a tail 22.

Figure 2:
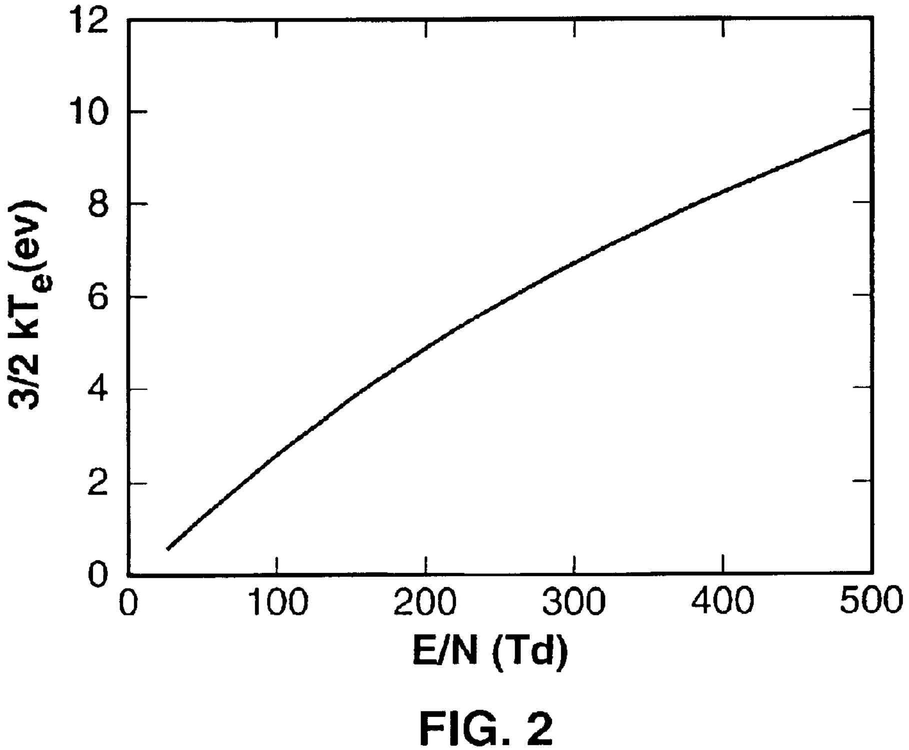
FIG. 2 is a graph of average electron energy versus reduced electric field (E/N).

It can be appreciated that a voltage pulse can be applied across the electrodes 10, 12. If the applied voltage pulse rise time and pulse duration are comparable to the streamer transit time across the gap 14, the drive circuit, described below, can influence the development of the discharge across the gap 14. If the applied electric field rises fast enough, each discharge streamer head 20 can coalesce to create quasi-homogenous discharges. It is to be understood that quasi-homogenous discharges can have very favorable consequences. For example, the discharge operates for a larger fraction of its duration at a higher, and more favorable, reduced electric field, i.e., electric field divided by gas density (E/N). Further, the discharge operates at a higher average electron energy. FIG. 2, for example, shows that the average electron energy increases with increasing reduced electric field for oxygen gas.

Further results of the quasi-homogenous discharges are greater yields, i.e., number per unit energy, of free radicals and other active species because these yields generally increase with increasing electron temperature. Moreover, with more homogenous discharges, the radicals are spread over a larger volume and have lower peak concentrations. As such, there is less competition from radical-radical interactions which tend to reduce the concentrations of active species and therefore, more active species survive to react with entrained pollutants or feed gas species.

Figure 3:
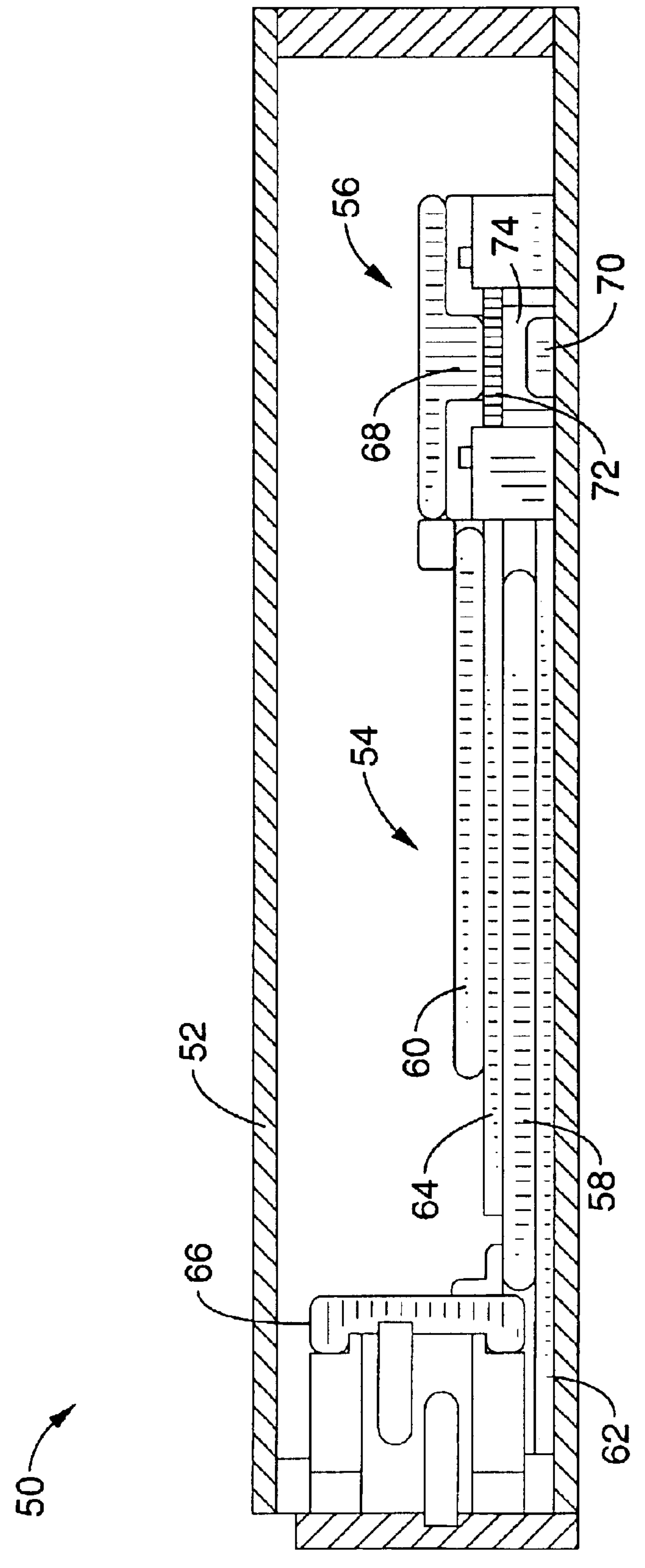
FIG. 3 is a side view of a first embodiment of a nonthermal plasma reactor with the housing cut away for clarity.

FIG. 3 shows a non-limiting, exemplary embodiment of a nonthermal plasma (NTP) reactor, generally designated 50. As shown in FIG. 3, the reactor 50 includes a generally rectangular, box-shaped housing 52 in which a charging assembly 54 and a discharge cell 56 are disposed. FIG. 3 shows that the charging assembly 54 includes a first capacitor plate 58 and a second capacitor plate 60. The first capacitor plate 58 rests on a first dielectric layer 62 (e.g., Mylar) which insulates it from the housing 52. Also, a second dielectric layer 64 is installed between the capacitor plates 58, 60. A spark gap switch 66 is connected to the first capacitor plate 58.

As shown in FIG. 3, the discharge cell 56 includes a first electrode 68 and a second electrode 70 that are separated by a dielectric layer 72. Preferably, the dielectric layer 72 is made from a material such as glass. A gas discharge gap 74 is established between the electrodes 68, 70. It is to be understood that after the capacitor plates 58, 60 are charged, the spark gap switch 66 can be used to control the electric pulse delivered across the electrodes 68, 70. It is to be understood that pollutant containing gas can be supplied to the gas discharge gap 74 where it can be treated as described in detail below.

Figure 4:
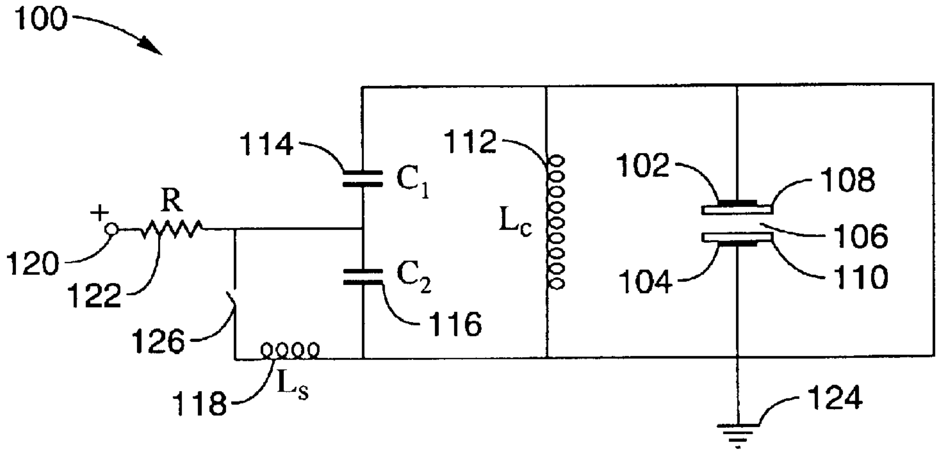
FIG. 4 is a schematic diagram of an electric circuit diagram representing the device shown in FIG. 3.

Referring now to FIG. 4, an electric circuit representing the device shown in FIG. 3 is shown and is generally designated 100. FIG. 4 shows that the circuit 100 includes a first electrode 102 and a second electrode 104 that are separated by a discharge gap 106. FIG. 4 also shows that a first dielectric layer 108 and second dielectric layer 110 can be disposed between the electrodes 102, 104 and that the discharge gap 106 can be established between the dielectric layers 108, 110. As shown in FIG. 4, a first inductor 112 is connected parallel to the electrodes 102, 104. Moreover, a first capacitor 114 and a second capacitor 116 are also installed in the circuit 100 such that they are connected in series to each other and the combination thereof is connected parallel to the first inductor 112 and the electrodes 102, 104.

FIG. 4 also shows a second inductor 118 that is connected to the circuit 100 adjacent to the second capacitor 116 the second inductor 118 represents the inherent inductance of the spark gap switch 126. Further, the circuit 100 is connected to a power source 120 such as a direct current (DC) power source. A resistor 122 is connected between the power source 120 and the circuit 100. As shown, the circuit 100 is also connected to ground 124, e.g., at the second electrode 104. The circuit 100 also includes a switch 126, e.g. a spark gap switch as described above. It is to be understood that the above described circuit 100 can be used to create a fast-pulse nonthermal discharge between the electrodes 102, 104.

Figure 5:
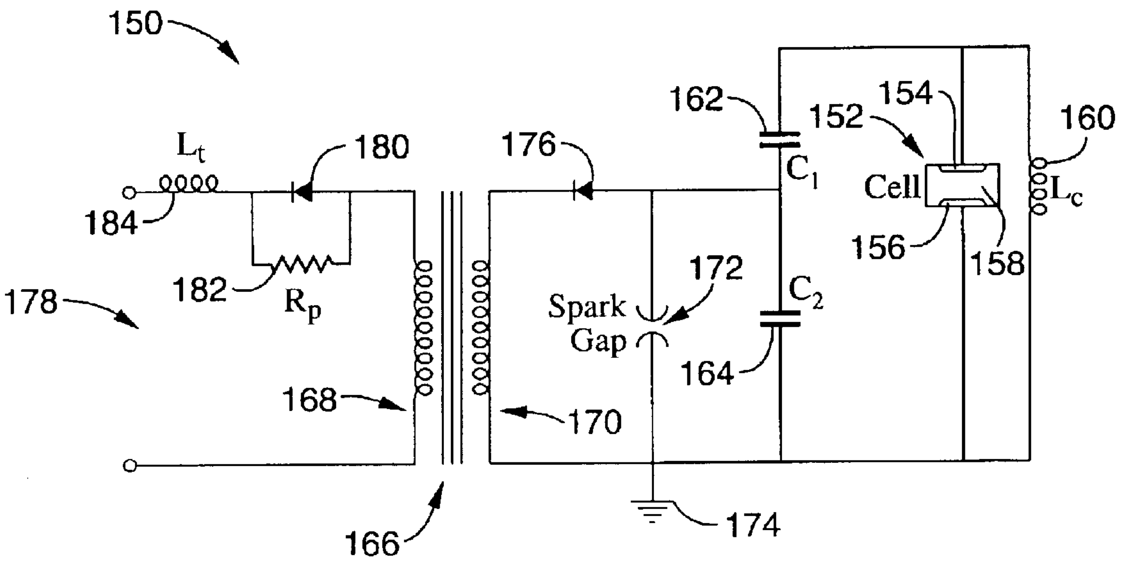
FIG. 5 is a schematic diagram of a resonant-charging circuit for the nonthermal plasma reactor shown in FIG. 3.

Referring now to FIG. 5, a resonant-charging circuit is shown and is generally designated 150. FIG. 5. shows that the circuit 150 includes a discharge cell 152 having a first electrode 154 and a second electrode 156 separated by a discharge gap 158. As shown in FIG. 5, a first inductor 160 is installed in the circuit so that it is parallel to the electrodes 154, 156. Moreover, a first capacitor 162 and a second capacitor 164 are connected in series to each other and the combination thereof is connected parallel to the first inductor 160 and the electrodes 154, 156.

FIG. 5 further shows a transformer 166 installed in the circuit 150. The transformer 166 includes a low voltage (input) side 168 and a high voltage (output) side 170. As shown the high voltage side 170 of the transformer 166 is installed in the circuit 150 so that it provides a high voltage signal to the capacitors 162, 164. FIG. 5 also shows a spark gap switch 172 is installed in the circuit parallel to the second capacitor 164. The spark gap switch 172 is connected to ground 174 and can be used to control the electric pulses that are delivered to the discharge cell 152 between the electrodes 154, 156. Preferably, in this embodiment, a first diode 176 is installed in the circuit 150 between the spark gap switch 172 and the transformer 166.

As shown in FIG. 5, the low voltage side 168 of the transformer 166 is connected to a power source 178 such as an AC power source. A second diode 180 and a resistor 182 are connected parallel to each other and the combination thereof is installed in series within the circuit 150 between the low voltage side 168 of the transformer 166 and the power source 178. A second inductor 184 is connected in series with the second diode 180 and resistor 182 combination between the power source 178 and the second diode 180 and resistor 182 combination. It is to be understood that the above described circuit 150 can be used to create a fast-pulse nonthermal discharge between the electrodes 154, 156 within the discharge cell 152.

Figure 6:
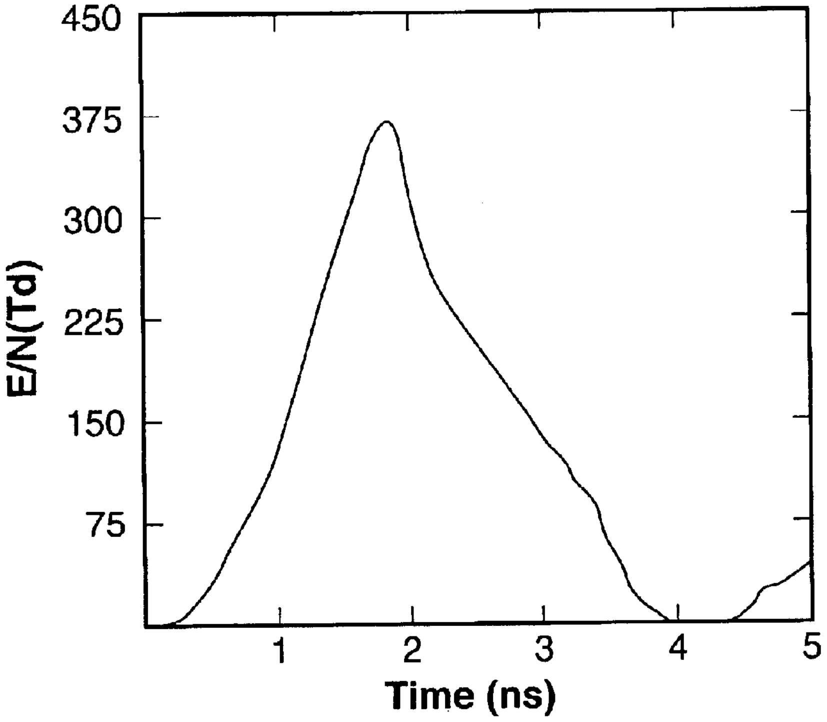
FIG. 6 is a graph of reduced electric field versus time.

FIG. 6 shows a reduced electric field waveform generated, e.g., by the reactor 50 shown in FIG. 3 with oxygen in the discharge cell 56, i.e. within the gas discharge gap 74. As shown in FIG. 6, the waveform peaks at approximately one and eight-tenths of a nanosecond (1.8 ns). This is a direct result of a high voltage pulse having an extremely fast rise time and short duration.

Figure 7:
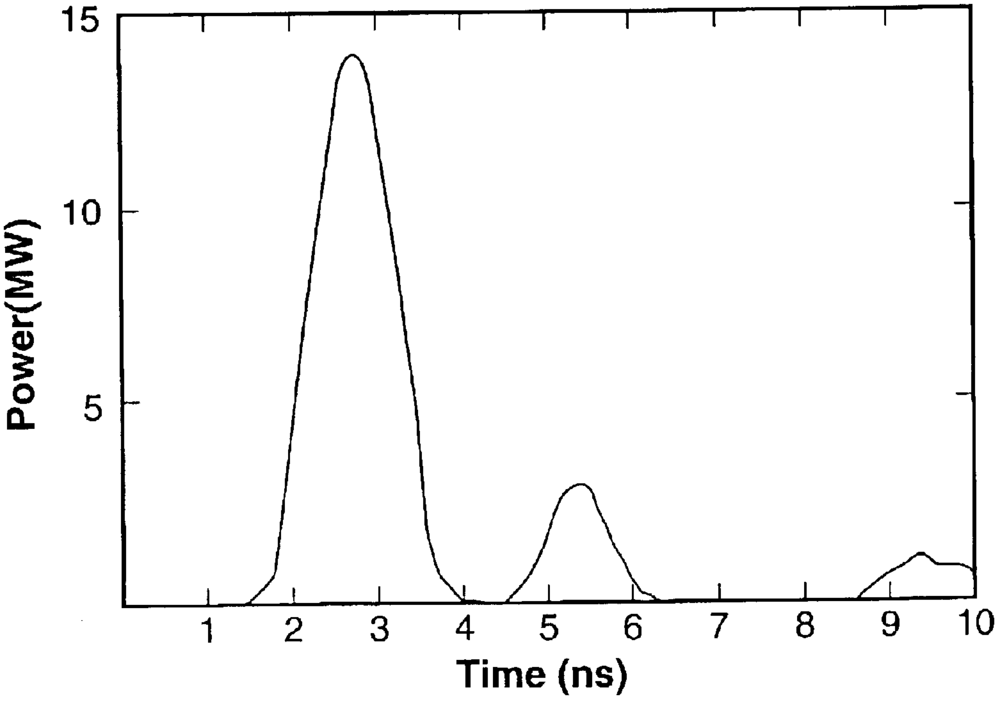
FIG. 7 is a graph of reactor power versus time.

FIG. 7 shows an exemplary, non-limiting graph of the short-pulse electrical discharge power versus time, e.g., for the reactor 50 shown in FIG. 3. As shown, the power peaks initially at approximately two and eight-tenths nanoseconds (2.8 ns) and as time elapses the amplitude of the power spikes decrease. Accordingly, very little power is wasted at times when electron temperature is low.

Figure 8:
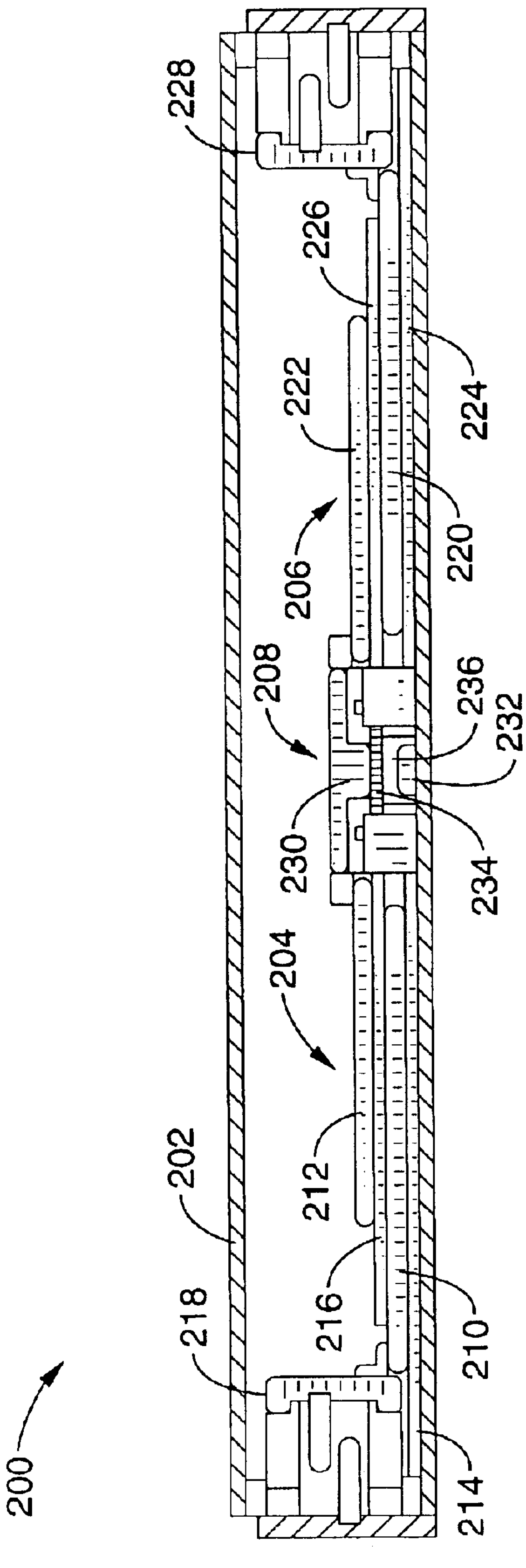
FIG. 8 is a side view of a second embodiment of a nonthermal plasma reactor with the housing cut away for clarity.

Referring now to FIG. 8 an alternative embodiment of a nonthermal reactor, generally designated 200. As shown in FIG. 8, the reactor 200 includes a generally rectangular, box-shaped housing 202 in which a first charging assembly 204 and a second charging assembly 206 are disposed. Each charging assembly 204, 206 is connected to a discharge cell 208 that is disposed in the housing 202 between the charging assemblies 204, 206. FIG. 8 shows that the first charging assembly 204 includes a first capacitor plate 210 and a second capacitor plate 212. The first capacitor plate 210 rests on a first dielectric layer 214 which insulates it from the housing 202. Also, a second dielectric layer 216 is installed between the capacitor plates 210, 212. A spark gap switch 218 is connected to the first capacitor plate 210.

Similar to the first charging assembly 204, the second charging assembly 206 includes a first capacitor plate 220 and a second capacitor plate 222. The first capacitor plate 220 rests on a first dielectric layer 224 which insulates it from the housing 202. Also, a second dielectric layer 226 is installed between the capacitor plates 220, 222. A spark gap switch 228 is connected to the first capacitor plate 220.

As shown in FIG. 8, the discharge cell 208 includes a first electrode 230 and a second electrode 232 that are separated by a dielectric layer 234. Preferably, in this embodiment, the dielectric layer 234 is made, e.g., from glass. A gas discharge gap 236 is established between the electrodes 230, 232. It is to be understood that the capacitor plates 210, 212 of the first charging assembly 204 and the capacitor plates 220, 222 of the second charging assembly 206 can be oppositely charged. Moreover, the spark gap switches 218, 228 can be alternatingly fired in order to alternatingly deliver opposite polarity pulses to the discharge cell 208.

Figure 9:
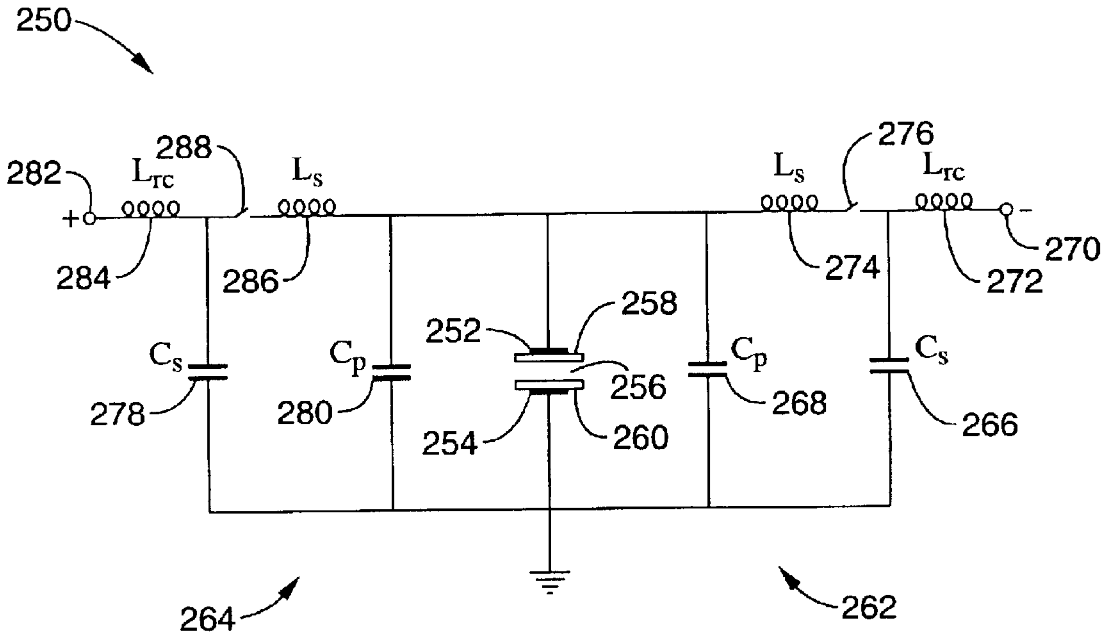
FIG. 9 is a schematic diagram of a circuit utilizing capacitive transfer circuits.

Referring to FIG. 9, a circuit diagram utilizing capacitive transfer circuits is shown and is generally designated 250. FIG. 9 shows that the circuit 250 includes a first electrode 252 and a second electrode 254 that are separated by a discharge gap 256. FIG. 9 also shows that a first dielectric layer 258 and second dielectric layer 260 can be disposed between the electrodes 252, 254 and that the discharge gap 256 can be established between the dielectric layers 258, 260.

As shown in FIG. 9, the circuit 250 includes a first capacitive-transfer circuit 262 and a second capacitive-transfer circuit 264 that provide pulses across the electrodes 252, 254 within the discharge gap 256. FIG. 9 shows that the first capacitive-transfer circuit 262 includes a storage capacitor 266 and a peaking capacitor 268 that are connected to the circuit 250 in series to each other and in parallel to the electrodes 252, 254. FIG. 9 also shows that the first capacitive-transfer circuit 262 is connected to a negative power source 270. A first inductor 272 is installed between the power source 270 and the first capacitive-transfer circuit 262. Moreover, a second inductor 274 and a switch 276 are shown between the first inductor 272 and the peaking capacitor 268. It is to be understood that the second inductor 274 shown in the first capacitive-transfer circuit 262 represents the inherent inductance of the switch 276 and the connections associated therewith.

Similar to the first capacitive-transfer circuit 262, the second capacitive-transfer circuit 264 includes a storage capacitor 278 and a peaking capacitor 280 that are connected to the circuit 250 in series to each other and parallel to the electrodes 252, 254. FIG. 9 also shows that the second capacitive-transfer circuit 264 is connected to a positive power source 282. A first inductor 284 is installed between the power source 282 and the second capacitive-transfer circuit 264. Moreover, a second inductor 286 and a switch 288 are shown between the first inductor 284 and the peaking capacitor 280. It is to be understood that the second inductor 286 shown in the second capacitive-transfer circuit 264 represents the inherent inductance of the switch 288 and the connections associated therewith.

It is to be understood that the storage capacitors 266, 278 are rapidly switched into the closely coupled peaking capacitors 268, 280. The capacitance of each peaking capacitor 268, 280 is less than its neighboring storage capacitor 266, 278. Accordingly, the peaking capacitors 268, 280 "ring-up" to a higher voltage than the charge voltage on the storage capacitors 266, 278 and electrical discharges are created across the electrodes 252, 254. It is to be understood that in order to deliver very fast time rise pulses to the electrodes 252, 254, the inductances represented by the second inductors 274, 286 in each capacitive-transfer circuit 262, 264 must be kept very low.

It can be appreciated that in each circuit 100, 150, 250 described above additional circuit elements, e.g., resistors, inductors, etc., can be included in order to facilitate pulse shaping.

It is to be understood that each reactor 50, 200 is a fast-pulsed nonthermal plasma (NTP) reactor that can be used to generate highly reactive chemical species, such as free radicals. These reactive species, e.g., O-atoms, OH-radicals, N-radicals, excited $N_2$ and $O_2$ molecules, $HO_2$-radicals, NH-radicals, CH-radicals, etc., readily decompose organic chemicals (e.g., VOCs), oxides of sulfur and nitrogen ($SO_2$ and NOx), and odor agents (e.g., aldehydes, $H_2S$ and many others) by breaking their chemical bonds. The result is the production of nonhazardous or easily-managed products. The free radicals, described above, can also play a key role in chemical synthesis, producing desirable products, e.g., creating higher-order hydrocarbon fuels from methane/natural gas.

Further, nonthermal plasmas can be created by the reactors 50, 200. As described in detail above, each reactor 50, 200 makes use of an extremely fast-pulsed dielectric-barrier discharge arrangement. A high voltage pulse having an extremely fast rise time, approximately one to ten nanoseconds (1–10 ns), and duration, approximately three to twenty nanoseconds (3–20 ns), is applied to the electrodes thereby creating electrical-discharge streamers in the gas. With a short enough rise time, the development of the discharges can be influenced such that the discharge gap undergoes electrical breakdown at a reduced electric field, electric field divided by gas density (E/N), much higher than the static field (or the field with a slower rise time)—a condition sometimes called "overvolting". This can create a quasi-homogeneous discharge condition in which most of the reactor active volume, i.e., the area between the electrodes, is filled with an electrical discharge having a high average electron energy. The discharges are the source of the active nonthermal plasma (NTP).

Each of the above-described NTP reactors 50, 200 are able to reduce hazardous compound concentrations in off-gases to very low levels by free-radical "cold combustion" or synthesize desirable chemical products using gaseous feedstocks. It is to be understood that although each NTP reactor 50, 200, described above, has a generally rectangular box shape, each can be modified to have a generally cylindrical shape.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A nonthermal plasma reactor, comprising:

a catalyst free discharge cell; and a charging assembly providing plural high voltage pulses to the discharge cell, each high voltage pulse having a rise time of not more than ten nanoseconds.

2. A nonthermal plasma reactor as recited in claim 1, wherein each high voltage pulse has a duration of not more than twenty nanoseconds.

3. A nonthermal plasma reactor as recited in claim 1, wherein the discharge cell comprises:

a first electrode;

a second electrode slightly spaced from the first electrode;

a dielectric layer adjacent to the first electrode; and a discharge gap established between the dielectric layer and the second electrode, the high voltage pulses being provided to the discharge cell such that nonthermal plasma discharge is created between the first electrode and the second electrode.

4. A nonthermal plasma reactor as recited in claim 1, wherein the charging assembly is a first charging assembly and the reactor further comprises:

a second charging assembly, the first charging assembly and the second charging assembly alternatingly providing opposite polarity high voltage pulses to the reactor.

5. A nonthermal plasma reactor as recited in calim 4, wherein the second charging assembly provides plural high voltage pulses to the discharge cell, each high voltage pulse having a rise time of not more than ten nanoseconds.

6. A nonthermal plasma reactor as recited in claim 5, wherein each opposite polarity high voltage pulse has a duration of not more than twenty nanoseconds.

7. A nonthermal plasma reactor as recited in claim 6, wherein the second charging assembly comprises:

a first capacitor plate;

a second capacitor plate;

a dielectric layer between the first capacitor plate and the second capacitor plate; and a spark gap switch connected to the first capacitor plate, the second capacitor plate being electrically connected to the discharge cell.

8. A nonthermal plasma reactor, comprising:

a discharge cell; and a charging assembly providing plural high voltage pulses to the discharge cell, each high voltage pulse having rise time of not more than ten nanoseconds, wherein the charging cell comprises:

a first capacitor plate;

a second capacitor plate;

a dielectric layer between the first capacitor plate and the second capacitor plate; and a spark gap switch connected to the first capacitor plate, the second capacitor plate being electrically connected to the discharge cell.

9. A nonthermal plasma reactor, comprising:

a first capacitor plate;

a second capacitor plate;

a dielectric between the first capacitor plate and the second capacitor plate;

a spark gap switch electrically connected to the first capacitor plate;

a first electrode electrically connected to the second capacitor plate;

a second electrode slightly spaced from the first electrode;

a dielectric layer adjacent to the first electrode; and a gas discharge gap established between the dielectric layer and the second electrode, the first capacitor plate and the second capacitor plate providing plural high voltage pulses to the discharge gap.

10. A nonthermal plasma reactor as recited in claim 9, wherein each high voltage pulse has a rise time of not more than ten nanoseconds.

11. A nonthermal plasma reactor as recited in claim 10, wherein each high voltage pulse has a duration of not more than twenty nanoseconds.

12. A nonthermal plasma reactor, comprising:

a discharge cell; end means for providing plural high voltage pulses to the discharge cell, each high voltage pulse having a rise time of not more than ten nanoseconds;

said means generating an overvolting condition in the discharge cell to create a plurality of quasi-homogeneous discharges.

13. A nonthermal plasma reactor as recited in claim 12, wherein each high voltage pulse has a duration of not more than twenty nanoseconds.

14. A nonthermal plasma reactor as recited in claim 12, further comprising:

means for providing opposite polarity high voltage pulses to the discharge cell.

15. A nonthermal plasma reactor as recited in claim 14, wherein each opposite polarity high voltage pulse has a rise time of not more than ten nanoseconds.

16. A nonthermal plasma reactor as recited in claim 15, wherein each opposite polarity high voltage pulse has a duration of not more than twenty nanoseconds.

17. A method for treating pollutant containing gases, comprising the acts of:

providing a discharge cell;

providing plural high voltage pulses to the discharge cell, each high voltage pulse having a rise time of not more than ten nanoseconds; and creating a plurality of quasi-homogeneous discharges as a result of the high voltage pulses.

18. A method as recited in claim 17, wherein each high voltage pulse has a duration of not more than twenty nanoseconds.

19. A method as recited in claim 18, wherein the high voltage pulses create nonthermal discharge within the discharge cell.

20. A method as recited in claim 17, wherein creating a plurality of quasi-homogeneous discharges comprises overvolting the discharge cell to produce an improved reduced electric field.

21. A method as recited in claim 20, wherein the discharge cell comprises a pair of spaced apart electrodes; and wherein overvolting the discharge cell comprises generating a discharge volume between the electrodes, the discharge volume having a high average electron energy.

22. A method as recited in claim 17, wherein the discharges coalesce due to the high voltage pulse rise to create the plurality of quasi-homogeneous discharges.

23. A nonthermal plasma reactor, comprising:

a discharge cell;

said discharge cell comprising and pair of spaced apart electrodes forming a discharge gap; and a charging assembly providing plural high voltage pulses to the discharge cell;

said high voltage pulses generating discharge streamers across the discharge gap;

said streamers having a streamer transit time across the gap;

said high voltage pulses having a pulse rise time and a pulse duration;

wherein said discharge gap and charging assembly are configured such that the pulse rise time and pulse duration are substantially similar to the streamer transit time.

24. A nonthermal plasma reactor as recited in claim 23, wherein:

said charging assembly is configured to deliver the high voltage pulses at pulse rate sufficient to create quasi-homogeneous discharges across the discharge gap.

25. A nonthermal plasma reactor as recited in claim 24, wherein:

each discharge streamer comprises a streamer head; and wherein said charging assembly is configured to deliver the high voltage pulses at pulse rate sufficient to cause each discharge streamer head to coalesce to create quasi-homogeneous discharges across the discharge gap.

26. A nonthermal plasma reactor as recited in claim 23, wherein the pulse rise time is not more than ten nanoseconds.

27. A nonthermal plasma reactor as recited in claim 23, wherein the pulse duration is not more than 20 nanoseconds.

28. A nonthermal plasma reactor as recited in claim 23, further comprising one or more dialectric layers disposed between the spaced apart electrodes.

29. A nonthermal plasma reactor, comprising:

a discharge cell; and a charging assembly providing plural high voltage pulses to the discharge cell, each high voltage pulse having a rise time of not more than ten nanoseconds;

wherein each high voltage pulse has a duration of not more then twenty nanoseconds.

30. A nonthermal plasma reactor as recited in claim 29, wherein said charging assembly is configured to deliver the high voltage pulses at pulse rate sufficient to create quasi-homogeneous discharges in the discharge cell.

* * * * *